Oct. 17, 1939.   H. ROTH ET AL   2,176,804
ELECTRICALLY DRIVEN GYROSCOPE
Filed June 11, 1937
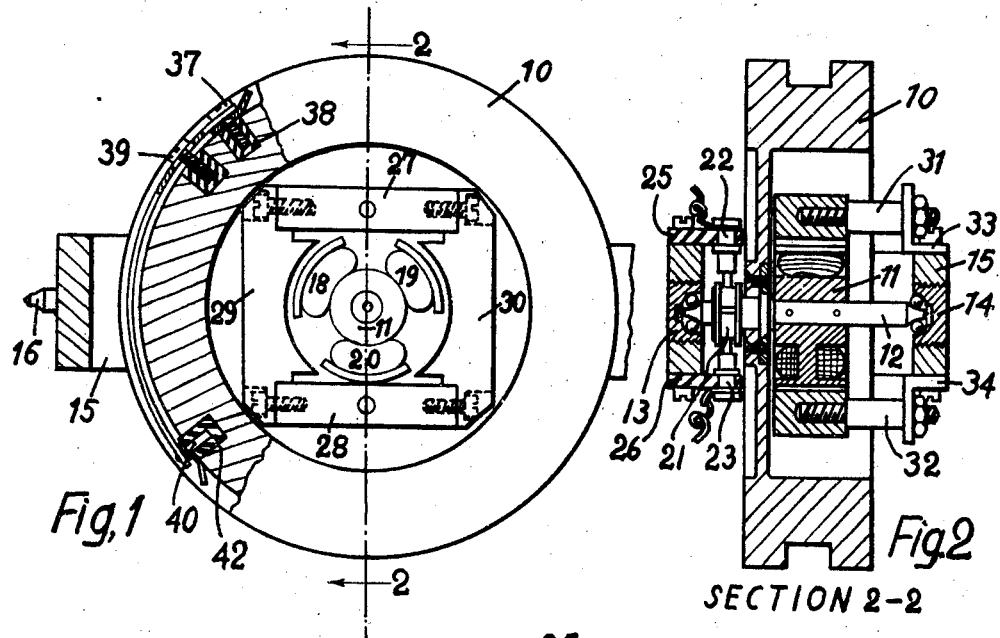
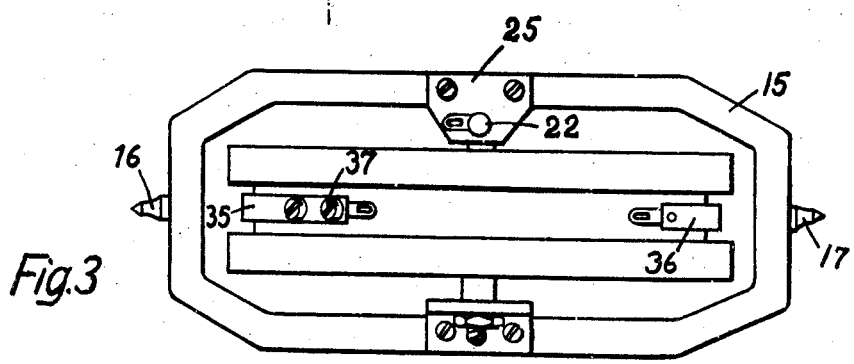
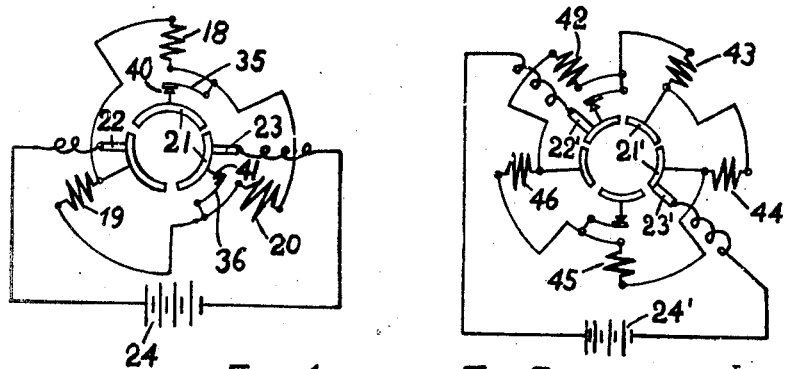
Inventors:
Heinz Roth and
Julius Möller
By A. D. Adams Patented Oct. 17, 1939

2,176,804

UNITED STATES PATENT OFFICE 2,176,804

ELECTRICALLY DRIVEN GYROSCOPE

Heinz Roth and Julius Möller, Frankfort-on-the-Main, Germany, assignors to Askania-Werke A. G., a corporation of Germany Application June 11, 1937, Serial No. 147,797
In Germany June 13, 1936

2 Claims. (Cl. 74—5)

This invention relates to electrically driven gyroscopes, more particularly of the type used on aircraft and known as turn-indicator, artificial horizon and directional gyroscopes.

Considerable fluctuations in the voltage of the source of current supplying the gyroscopes with motive power have proved a source of trouble. Fluctuations as great as between 20 and 28 volts are quite common on aircraft, resulting in an undesirable change of speed of the gyroscope rotors and rendering the indications of such gyroscopes faulty in which the precessional force is a basis of the indication. The precessional force, and thereby the indication, of a turn indicator gyroscope, for example, is both a function of the outside torque exerted on the same and the speed of the rotor. It appears therefore that an increase in speed of the gyroscope will appear in the indication as an apparent greater rate of turn, thereby making the instrument unreliable for blind flying.

Inasmuch as due to the great rotor speeds of gyroscopes an application of the conventional velocity responsive regulators used on electromotors proved unsuccessful, various ways and means were devised to maintain the gyroscope speed constant. For example the direct current created by the aircraft generator has been converted into single or three phase alternating current and the gyroscopic instrument equipped with an A. C. motor. Such installations, however, are complicated and expensive.

It is therefore an object of this invention to provide a simple and reliable gyroscope having a velocity responsive regulator for maintaining the rotor speed constant.

It is a further object of this invention to provide a rotor speed regulator that will obviate a consumption of energy in resistances which unnecessarily increases the load on the battery or generator.

Further aims, objects and advantages will appear from a consideration of the description which follows with the accompanying drawings showing an embodiment of this invention for illustrative purposes. It is to be understood, however, that the description is not to be taken in a limiting sense, the scope of the invention being defined in the appended claims.

Referring to the drawing:

Fig. 1 is a sectional elevation of a gyroscope embodying the invention.

Fig. 2 is a section on line 2—2 of the instrument shown in Fig. 1.

Fig. 3 is a plan view of the same instrument.

Figs. 4 and 5 are wiring diagrams illustrating the operation of the invention.

A gyro rotor shown in the illustrated example as including a flywheel 10 and an armature body 11 is mounted for rotation with its axis 12 in antifriction bearings 13 and 14 in a rotor bearing member 15. The rotor bearing member, in turn, is provided with pivots 16 and 17 for mounting in any suitable support (not shown). Three armature windings 18, 19, 20 are provided on the rotor and their ends are connected to collector segments 21 rotatable with the rotor. Sliding contacts or brushes 22 and 23 serve for supplying current to the rotor winding from a source 24 (Fig. 4). The brushes are secured to the rotor bearing member 15 by means of insulating brackets 25 and 26.

A stationary field is shown in the example as including permanent magnets 27, 28 and pole pieces 29, 30 secured thereto. The field is secured to the rotor bearing member by means of studs 31, 32 and bracket 33, 34.

Centrifugal force operated contacts, shown in the illustrated example as having the form of flat springs 35, 36 are positioned in a recess at the circumference of the rotor. The springs of which only one is visible in Fig. 1 are mounted on the rotor flywheel by means of screws 37 and insulating bushings 38. A second screw 39 serves for adjusting the tension of the spring.

In the illustrated example, the springs 35 and 36 form break contact with fixed contact points 40 and 41 one of which is shown in Fig. 1, mounted in a similar bushing 42.

The electrical connection of the centrifugal force operated contacts is illustrated in Fig. 4. The battery is connected to the brushes 22, 23. The windings 18, 19 and 20 are each connected between two sectors of the collector 21, two of said connections being interrupted by the break contacts 35, 40 and 36, 41 upon reaching of a predetermined rotor speed. It is easily seen that two circuits exist in the rotor, the one, in the position shown, being 22, 18, 20, 23 and the other 22, 19, 23. Both of the circuits are interrupted when the contacts 35, 40 and 36, 41 open.

An embodiment of the invention applied to a rotor having five rotor windings is shown in Fig. 5. The windings are 42, 43, 44, 45 and 46. Current is again supplied from the battery 24' through the brushes 22' and 23' to the collector 21' which in this example has five sectors. Two circuits again exist, the one being 22', 43, 44, 23' and the other 22', 42, 46, 35, 23'. Both of the circuits are interrupted when the contacts 35', 40' and 36', 41' open.

It is easily seen that the most suitable arrangement of the contacts is at points which lie electrically diametrically opposite to each other. If, for example, the contacts were connected in the conductors leading from two adjoining collector sectors one circuit would remain uninterrupted and the corresponding decrease in speed will be small.

In a rotor having only three windings, the opposite points are necessarily also adjoining points, while in rotors having five or more windings the proper connection is at points as remote from each other as possible, herein called electrically diametrical.

Obviously, the present invention is not restricted to the particular embodiment herein shown and described.

What is claimed is:

1. Gyroscope comprising, in combination, a gyro rotor pivotally mounted about a first axis in a frame which is itself pivotally mounted for rotation about a second axis which is perpendicular to the axis of rotation of the gyro rotor; an electric motor driving said gyro rotor having a magnetic field system fixedly mounted on the frame and an armature mounted for rotation in said field, said armature being fixedly connected to the first axis and concentrically arranged to the gyro rotor, an electric power source supplying said motor with electrical energy; centrifugally operated break contacts mechanically connected to said rotor and adapted to automatically interrupt the flow of current to the armature at a predetermined speed of the electric motor for maintaining constant the precessional force of the gyro rotor independently of fluctuations of the voltage of the electric power source.

2. Gyroscope comprising, in combination, a gyro rotor pivotally mounted about a first axis in a frame which is itself pivotally mounted for rotation about a second axis which is perpendicular to the axis of rotation of the gyro rotor; an electric motor driving said gyro rotor having a magnetic field system fixedly mounted on the frame and an armature mounted for rotation in said field, said armature being fixedly connected to the first axis and concentrically arranged to the gyro rotor, an electric power source supplying said motor with electrical energy; and centrifugally operated break contacts, each having a point fixed to the periphery of the rotor and a flat spring extending concentrically to the periphery of the rotor to be responsive to centrifugal forces and cooperating with said contacts to automatically interrupt the flow of current to the armature at a predetermined speed of the electric motor for maintaining constant the precessional force of the gyro rotor independently of fluctuations of the voltage of the electric power source.

HEINZ ROTH.
JULIUS MÖLLER.